(12) United States Patent
Shogano et al.

(10) Patent No.: US 7,630,857 B2
(45) Date of Patent: Dec. 8, 2009

(54) ENVIRONMENTAL INFORMATION AGGREGATING APPARATUS AND METHOD

(75) Inventors: Keisuke Shogano, Kitanagoya (JP); Setsuo Kawakami, Hitachi (JP); Yoshiaki Ichikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 11/998,625

(22) Filed: Nov. 29, 2007

(65) Prior Publication Data

US 2008/0183432 A1    Jul. 31, 2008

(30) Foreign Application Priority Data

Nov. 30, 2006   (JP)   ............................ 2006-325054

(51) Int. Cl.
*G04F 1/00* (2006.01)
(52) U.S. Cl. ...................................... 702/176; 709/201
(58) Field of Classification Search ................. 702/176, 702/117, 118, 182–185, 188; 709/201
See application file for complete search history.

(56) References Cited

U.S. PATENT DOCUMENTS

2002/0095500 A1\*   7/2002   Schmidt ..................... 709/226
2007/0225989 A1\*   9/2007   Whitley et al. ................. 705/1

FOREIGN PATENT DOCUMENTS

JP    2004-062471    2/2004

\* cited by examiner

*Primary Examiner*—Edward Raymond
(74) *Attorney, Agent, or Firm*—Townsend and Townsend and Crew LLP

(57) ABSTRACT

An environmental information aggregating apparatus for transmitting information on an environmental aspect having a stratum structure to an external apparatus, includes: a storage unit for storing, in correspondence with an aspect identifier for identifying the environmental aspect, measured aspect information including a measured value of the environmental aspect and a measurement time, and transmission conversion information including a coefficient for converting a numerical value of the environmental aspect in accordance with a unit system of the external apparatus and an aspect identifier for identifying the environmental aspect at the external apparatus; and a calculating/processing unit for converting the measured value in the measured aspect information by using the coefficient in the transmission conversion information, generating aspect information including a conversion result value, the aspect identifier of the external apparatus in the transmission conversion information, and transmitting the generated aspect information to the external apparatus.

5 Claims, 12 Drawing Sheets

FIG.3A

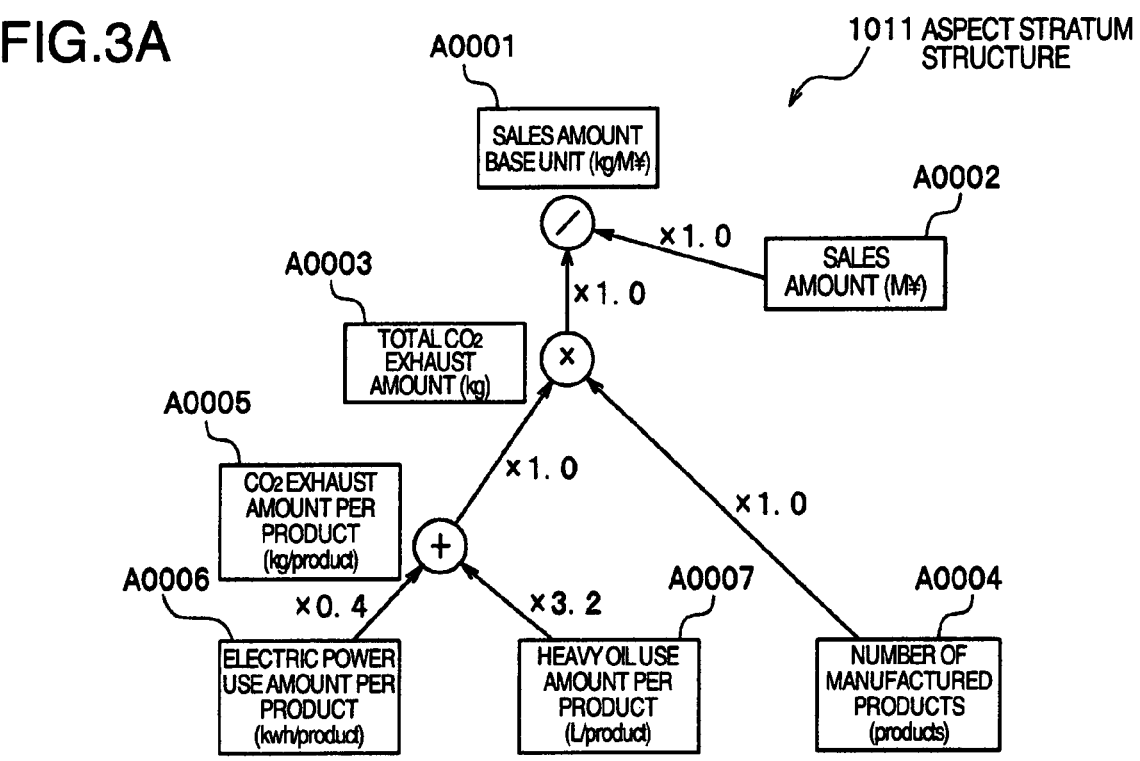

FIG.3B

1012 ASPECT DEFINITION INFORMATION

| ASPECT IDENTIFIER | ASPECT NAME | ASPECT UNIT | UPPER REGISTRATION OBJECT FLAG |
|---|---|---|---|
| A0001 | SALES AMOUNT BASE UNIT | kg/M¥ | 0 |
| A0002 | SALES AMOUNT | M¥ | 0 |
| A0003 | TOTAL $CO_2$ EXHAUST AMOUNT | kg | 1 |
| A0004 | NUMBER OF MANUFACTURED PRODUCTS | product | 1 |
| A0005 | $CO_2$ EXHAUST AMOUNT PER PRODUCT | kg/product | 0 |
| A0006 | ELECTRIC POWER USE AMOUNT PER PRODUCT | kwh/product | 0 |
| A0007 | HEAVY OIL USE AMOUNT PER PRODUCT | L/product | 0 |

FIG.3C

1013 ASPECT STRATUM INFORMATION

| PARENT IDENTIFIER | SIBLING IDENTIFIER | CONVERSION COEFFICIENT | OPERATOR |
|---|---|---|---|
| A0001 | A0003 | 1.0 | × |
| A0001 | A0002 | 1.0 | / |
| A0003 | A0004 | 1.0 | × |
| A0003 | A0005 | 1.0 | × |
| A0005 | A0006 | 0.4 | + |
| A0005 | A0007 | 3.2 | + |

1021 ORGANIZATION STRATUM STRUCTURE

1022 ORGANIZATION DEFINITION INFORMATION

| ORGANIZATION IDENTIFIER | |
|---|---|
| S0001 | COMPANY A |
| S0002 | COMPANY B1 |
| S0003 | COMPANY B2 |
| S0004 | COMPANY C1 |
| ⋮ | ⋮ |
| S0008 | FACTORY F |

1023 ORGANIZATION STRATUM INFORMATION

| PARENT IDENTIFIER | SIBLING IDENTIFIER |
|---|---|
| S0001 | S0002 |
| S0001 | S0003 |
| S0003 | S0004 |
| ⋮ | ⋮ |
| S0004 | S0008 |

1032 TIME ELEMENT DEFINITION INFORMATION

| TIME SECTION IDENTIFIER | DATE TIME VALUE |
|---|---|
| T2006 | 2006 (year) |
| T200601 | 1 (JANUARY) |
| T200602 | 2 (FEBRUARY) |
| ⋮ | ⋮ |
| T20060201 | FEBRUARY 1 |
| ⋮ | ⋮ |

1033 TIME STRATUM INFORMATION

| PARENT TIME SECTION IDENTIFIER | SIBLING TIME SECTION IDENTIFIER | |
|---|---|---|
| T2006 | T200601 | ⎫ |
| T2006 | T200602 | ⎬ 10331 |
| ⋮ | ⋮ | |
| T2006 | T200612 | ⎭ |
| ⋮ | ⋮ | |
| T200602 | T20060201 | ⎫ |
| ⋮ | ⋮ | ⎬ 10332 |
| T200602 | T20060228 | ⎭ |
| ⋮ | ⋮ | |

FIG.6A

1041 LOWER END ASPECT INFORMATION

| ASPECT IDENTIFIER | ORGANIZATION IDENTIFIER | DATE AND TIME | NUMERICAL VALUE |
|---|---|---|---|
| A0004 | S0003 | 20060601 12:32:10 | 1000.0 |
| A0007 | S0003 | 20060604 08:14:07 | 153.2 |
| A0002 | S0003 | 20060604 09:10:02 | 22000.0 |
| A0004 | S0003 | 20060605 17:00:00 | 3600.0 |
| : | : | : | : |

FIG.6B

1042 ASPECT AGGREGATION INFORMATION

| ASPECT IDENTIFIER | ORGANIZATION IDENTIFIER | TIME SECTION IDENTIFIER | NUMERICAL VALUE |
|---|---|---|---|
| A0003 | S0003 | T20060501 | 1500.0 |
| A0003 | S0003 | T20060502 | 2700.0 |
| A0003 | S0003 | T20060503 | 1800.0 |
| A0015 | S0004 | T20060 | 350.8 |
| : | : | : | : |

FIG.7

1051 TRANSMISSION CONVERSION INFORMATION

| ASPECT IDENTIFIER | UPPER ORGANIZATION IDENTIFIER | UPPER ASPECT IDENTIFIER | ORGANIZATION IDENTIFIER IN UPPER ORGANIZATIONS | CONVERSION COEFFICIENT |
|---|---|---|---|---|
| A0003 | S0001 | B0003 | S0003 | 0.001 |
| A0004 | S0001 | B0004 | S0003 | 0.001 |
| A0015 | S0001 | B0015 | S0003 | 1 |
| A0103 | P1232 | C0318 | P1233 | 0.001 |
| : | : | : | : | : | ically to an environmental infor-
ENVIRONMENTAL INFORMATION AGGREGATING APPARATUS AND METHOD

INCORPORATION BY REFERENCE

The present application claims priority from Japanese application JP2006-325054 filed on Nov. 30, 2006, the content of which is hereby incorporated by reference into this application.

BACKGROUND OF THE INVENTION

The present invention relates to an information processing apparatus, and more particularly to an environmental information aggregating and analyzing apparatus and method for transmitting information on an environmental aspect matching the conditions of a transmission destination.

A conventional server-client type computer system is, for example, an environmental information aggregating and analyzing system such as described in JP-A-2004-62471 (see paragraphs [0037] to [0040], FIGS. 9 and 10). The environmental information aggregating and analyzing system described in JP-A-2004-62471 is an information processing system which processes environmental information and can deal with a design change flexibly without changing a program, by changing definition information stored in each database.

In the information processing system dealing environmental information, information on works such as environment management, environment accounts, and chemical substance management is information on an aspect (environmental aspect) defined in ISO14001. Namely, the information is "factors of products/activities/services of each organization". There are a wide variety of aspects in various fields, including quantities of use/dump/storage of chemical substances, the number of claims made by nearby inhabitants, costs of environmental circle events, a recycle quantity of shipped products, the occurrence number of labor accidents and the like, and there are a variety of names and units.

SUMMARY OF THE INVENTION

The environmental information aggregating and analyzing system described in JP-A-2004-62471 is a server-client type that one server aggregates information on environmental aspects. It is necessary to store in a database, as master information, information on environmental aspects of each environment management organization. Therefore, if an enterprise scale becomes large, it becomes difficult to manage a bulky amount of environmental aspect information, and a load is concentrated on the server, resulting in a performance issue.

If an enterprise scale is large; it is desired to make each environment management organization have a server for managing master information and to configure a distributed system connecting each server by a network.

However, information on environmental aspects to be aggregated and processed at each environmental organization is often optimized at the environmental organization. There arises, therefore, an issue that information on environmental aspects cannot be shared, if each server is merely connected by a network.

An object of the present invention is therefore to provide a means for transmitting information on environmental aspects by matching the information to the conditions of an information transmission destination.

In order to settle the above-described issue, the present invention provides an environmental information aggregating apparatus for transmitting information on an environmental aspect having a stratum structure to an external apparatus, comprising: a storage unit for storing, in correspondence with an aspect identifier for identifying the environmental aspect, measured aspect information including a measured value of the environmental aspect and a measurement time, and transmission conversion information including a coefficient for converting a numerical value of the environmental aspect in accordance with a unit system of the external apparatus and an aspect identifier for identifying the environmental aspect at the external apparatus; and a calculating/processing unit for converting the measured value in the measured aspect information by using the coefficient in the transmission conversion information, generating aspect information including a conversion result value, the aspect identifier of the external apparatus in the transmission conversion information, and transmitting the generated aspect information to the external apparatus.

Other aspects of the present invention will be later described in detail in the preferred embodiments.

According to the present invention, it is possible to transmit information on environmental aspects by making the information match the conditions of an information transmission destination.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram showing an aspect stratum structure, and FIGS. 3B and 3C are diagrams showing information stored in an organization stratum definition database in correspondence with the aspect stratum structure.

FIGS. 6A and 6B are diagrams showing information stored in an aspect database.

FIG. 7 is a diagram showing transmission conversion information stored in a transmission conversion definition database.

DESCRIPTION OF THE EMBODIMENTS

The preferred embodiments of the present invention will now be described in detail with reference to the accompanying drawings. In the embodiments, description will be made on a process of aggregating information on environmental aspects to be executed at an enterprise group or the like constituting a stratum structure.

(Overall Structure)

Figure 1:
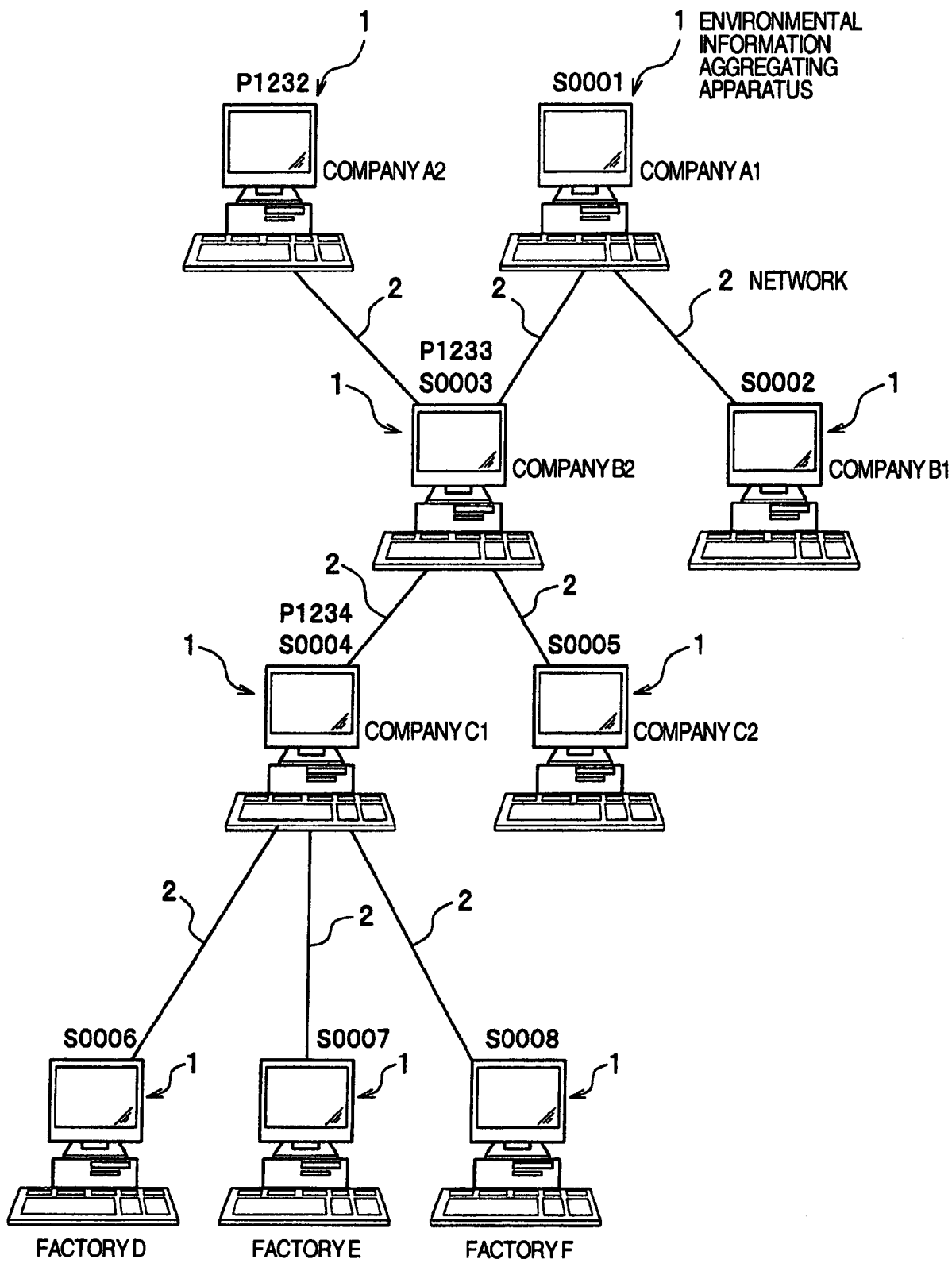
FIG. 1 is a diagram showing an example of the configuration of an environmental information aggregating system.

FIG. 1 is a diagram showing an example of the configuration of an environmental information aggregating system according to an embodiment of the present invention. The environmental information aggregating system shown in FIG. 1 is constituted of a plurality of environmental information aggregating apparatus 1 installed at each of enterprises, subsidiary companies, factories and the like and interconnected by a network 2 in a stratum structure. Each environmental information aggregating apparatus 1 is a computer for aggregating and managing information on environmental aspects at each company or the like, the detailed description thereof being given later.

The stratum relation between environmental information aggregating apparatus 1 corresponds to the stratum relation between enterprises and the like, and is shown conceptually. Each environmental information aggregating apparatus 1 is connected to the same network 2 such as a public line and a wide area network (WAN).

A number described above each environmental information aggregating apparatus 1 is an organization identifier capable of identifying each environmental information aggregating apparatus 1. This organization identifier will be later described.

(Environmental Information Aggregating Apparatus)

Figure 2:
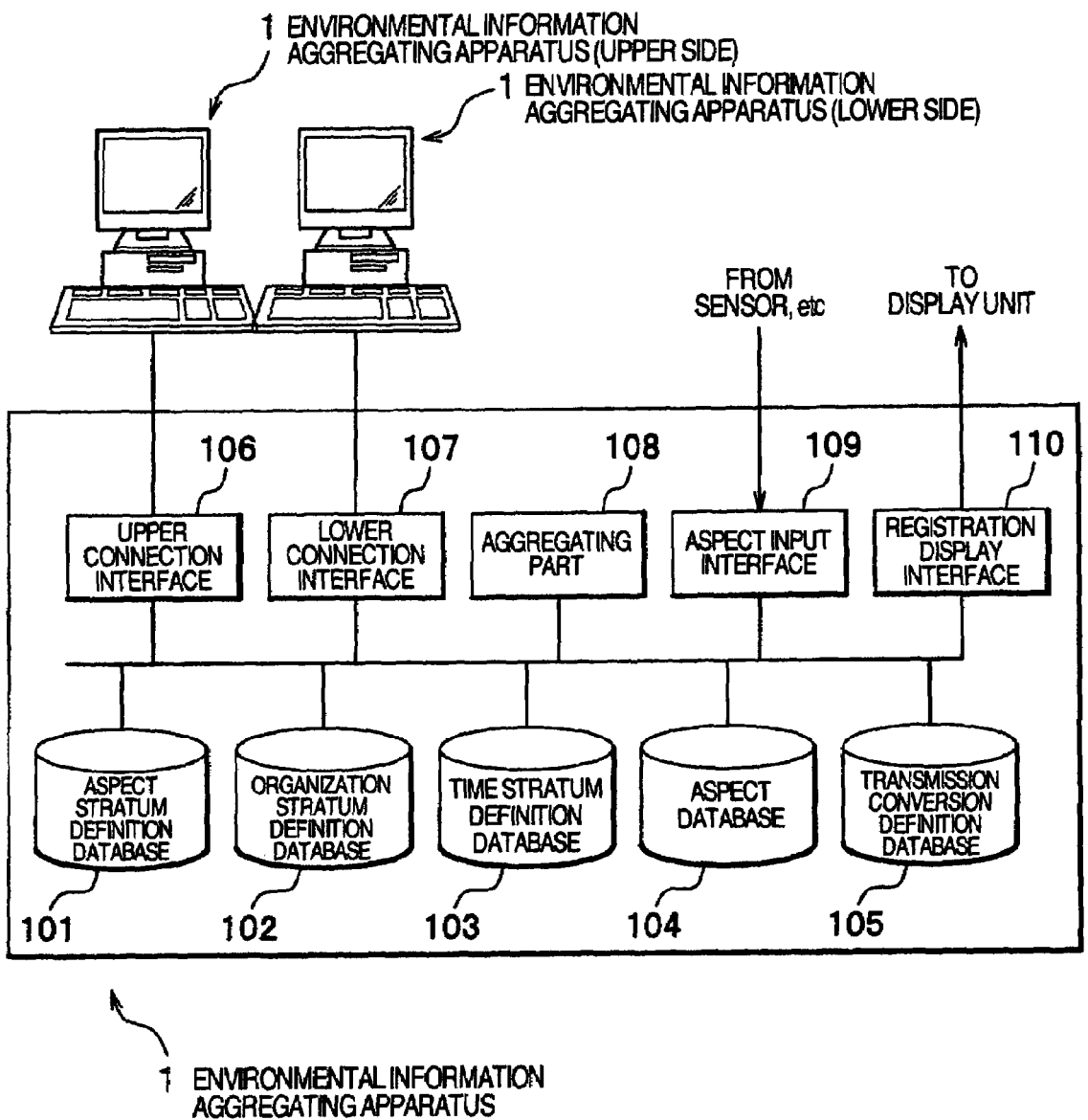
FIG. 2 is a block diagram showing the structure of an environmental information aggregating apparatus.

FIG. 2 is a block diagram showing an example of the environmental information aggregating apparatus 1 shown in FIG. 1. The environmental information aggregating apparatus 1 is constituted of an aspect stratum definition database 101, an organization stratum definition database 102, a time stratum definition database 103, an aspect database 104, a transmission stratum definition database 105, an upper connection interface 106, a lower connection interface 107, an aggregating part 108, an aspect input interface 109 and a registration display interface 110.

The upper connection interface 106 is an interface with an environmental information aggregating apparatus 1 (hereinafter called an upper apparatus) positioned at an upper level in the stratum structure of environmental information aggregating apparatus 1 shown in FIG. 1, and has a function of transferring aggregated values of aspects stored in the own environmental information aggregating apparatus to the upper apparatus, as aspect information converted to match the data format of the upper apparatus.

The lower connection interface 107 is an interface with an environmental information aggregating apparatus 1 (hereinafter called a lower apparatus) positioned at a lower level in the stratum structure of environmental information aggregating apparatus 1 shown in FIG. 1, and has a function of receiving and authenticating the aspect information supplied from the lower apparatus.

The detailed operations of the upper and lower connection interfaces 106 and 107 will be given later.

The aggregating part 108 has a function of aggregating measured aspect values acquired from sensors and the like (not shown) during a predetermined time section, and calculating each measured aspect value.

The aspect input interface 109 is an interface for acquiring measured aspect values from sensors and the like (not shown).

The registration display interface 110 is an interface for displaying, on a display screen of a display or the like (not shown), an input display screen to be used when aspect information is transmitted to the upper apparatus from the upper connection interface 106. Description will be later given on the sequence of processes to be executed by the aggregating part 108 and an example of the input screen to be displayed by the registration display interface 110.

The aspect stratum definition database 101 stores information on an aspect stratum structure defining the relation between respective aspects. FIG. 3A is a diagram showing an example of the aspect stratum structure, and FIGS. 3B and 3C are diagrams showing an example of information stored in the aspect stratum definition database 101 in correspondence with the aspect stratum structure.

The aspect stratum structure 1011 shown in FIG. 3A shows the concept of mutual relation between "sales amount base unit", "total $CO_2$ exhaust amount", "$CO_2$ exhaust amount per product", "sales amount", "number of manufactured products", "heavy oil use amount per product" and "electric power use amount per product", which are aspects of a company.

For example, if the "electric power use amount per product" in the aspect stratum structure 1011 is 1 kwh/product, it is equivalent to that $CO_2$ of 0.4 (=1×0.4) kg/product was exhausted to the atmospheric air.

Also, if the "heavy oil use amount per product" is 1 L/product, it is equivalent to that $CO_2$ of 3.2 (=1×3.2) kg/product was exhausted to the atmospheric air. Therefore, if electric power and heavy oil are consumed in a manufacture process of some product, a $CO_2$ exhaust amount is a sum of each weighted use amount.

The "total $CO_2$ exhaust amount" of the company as a whole can be calculated by multiplying the $CO_2$ exhaust amount per product" by the "number of manufactured products", and the "sales amount base unit" can be calculated by dividing the "total $CO_2$ exhaust amount" by the "sales amount". The aspect stratum definition database 101 stores information on the stratum relation between these aspects.

As shown in FIGS. 3B and 3C, the aspect stratum definition database 101 of this embodiment stores aspect definition information 1012 and aspect stratum information 1013 as information representative of the stratum relation between aspects.

The aspect definition information 1012 contains items of information for defining each aspect: "aspect identifier" for identifying an aspect, "aspect name" of the aspect, "aspect unit" indicating the unit of a numerical value of the aspect, and "upper registration object flag" which is a flag indicating whether the aggregated values of the aspect are transmitted to the upper apparatus as aspect information.

The aspect stratum information 1013 contains items of information for indicating the stratum between aspects: "parent identifier" representative of a parent and "sibling identifier" representative of a sibling respectively for defining the stratum relation between aspects, "conversion coefficient" to be multiplied when calculating the upper aspect of the parent from the lower aspect of the sibling, and "operator" to be used for this calculation.

For example, a calculation rule for a numerical value of the "sales amount base unit" of the item "aspect identifier" of "A0001" in the aspect definition information 1012 is written in the first- and second-rows of the aspect stratum information 1013. Namely, it is recorded that calculation is performed by using the total $CO_2$ exhaust amount (A0003) as a numerator (multiplication) and the sales amount (A0002) as a denominator (division).

Also, a calculation rule for the total $CO_2$ exhaust amount" (A0003) is written in the third- and fourth-rows of the aspect stratum information 1013. Namely, it is recorded that calculation is performed by multiplication of the number of manufactured products" (A0004) and "$CO_2$ exhaust amount per product" (A0005). Further, a calculation rule for the "$CO_2$ exhaust amount per product" (A0005) is written in the fifth- and sixth-rows of the aspect stratum information 1013. Namely, it is recorded that calculation is performed by summation of a numerical value of the "electric power use amount per production" (A0006) multiplied by 0.4 time and a numerical value of the "heavy oil use amount per production" (A0007) multiplied by 3.2 times. In this manner, the complicated stratum relation between aspects is defined by a set of a plurality of records.

The aspect stratum data stored in the aspect stratum definition database 101 described above can be regarded as fundamental know-how of environment management. Namely, the aspect stratum data may be regarded as a file which defines concrete algorithms for how collectable information (lower end aspect) is converted into management information (upper aspect) for analysis, depending upon the object of environment management.

The organization stratum definition database 102 is a database for storing organization stratum data which defines the stratum relation between a plurality of different organizations (enterprises, subsidiary companies, subsidiary factories and the like).

Figures 4A, 4B, 4C:
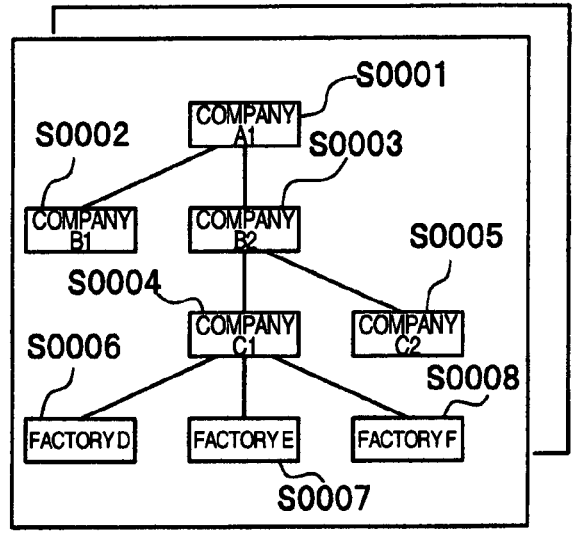
FIG. 4A is a diagram showing strata between organizations.
FIGS. 4B and 4C are diagrams showing information stored in an organization stratum definition database in correspondence with the inter-organization stratum structure.

FIG. 4A is a diagram showing an example of the stratum structure of organizations, and FIGS. 4B and 4C are diagrams showing examples of information stored in the organization stratum definition database 102 in correspondence with the stratum structure of organizations.

The organization stratum structure 1021 shown in FIG. 4A shows the concept of the stratum relation between organizations of some enterprize organization (companies, factories and the like). For example, a "company A1" has subsidiary companies, "company B1" and "company B2", and the "company B2" has subsidiary companies, "company C1" and "company C2". The "company C1" has "factory D", "factory E" and "factory F". Aspects aggregated at each organization are transmitted to an upper organization in accordance with the stratum structure.

In this embodiment, aspects are aggregated in accordance with an organization system of a group enterprise. However, not only group enterprises but also organizations in the same enterprize, and a facility and the like which aggregate aspects independently from an enterprise, may be elements of the organization stratum structure 1021. Therefore, there may exist a plurality of organization stratum structures 1021 belonging to one organization.

As shown in FIGS. 4B and 4C, the organization stratum definition database 102 of the embodiment stores organization definition information 1022 and organization stratum information 1023, as information representative of the stratum relation between organizations. The organization definition information 1022 contains items for defining each organization: an "organization identifier" for identifying each organization and a "name" of the organization.

The organization stratum information 1023 has records each storing a pair of a "parent identifier" representative of a parent and a "sibling identifier" representative of a sibling respectively in the stratum relation between organizations. For example, the first and second records of the organization stratum information 1023 store the parent identifier "S0001" indicating company A1 and the sibling identifiers "S0002" indicating company B1 and "S0003" indicating company B2, respectively. It can be understood that the organization stratum information is in correspondence with the organization stratum structure 1021.

In this embodiment, each organization is provided with one environmental information aggregating apparatus 1 so that the "organization identifier" can be used as an identifier for identifying each environmental information aggregating apparatus 1.

Figures 5A, 5B, 5C:
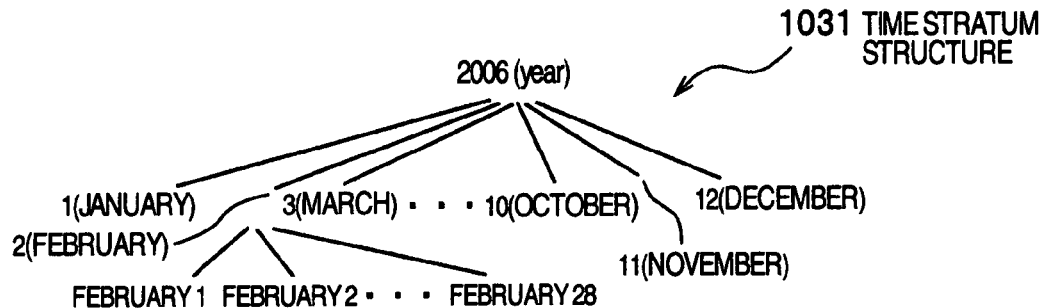
FIG. 5A is a diagram showing a time stratum structure.
FIGS. 5B and 5C are diagrams showing information stored in a time stratum definition database.

The time stratum definition database 103 stores information on a time stratum structure which defines a stratum relation between time sections. FIG. 5A is a diagram showing an example of the time stratum structure, and FIGS. 5B and 5C are diagrams showing examples of information stored in the time stratum definition database 103 in correspondence with the time stratum structure.

The time stratum structure 1031 shown in FIG. 5A shows the stratum structure of time sections. This time stratum structure shows the concept of the stratum structure between parent and sibling time sections. For example, a time section "2006 year" has as its siblings "January" to "December", and a time section "February" has "February 1" to "February 28".

As shown in FIGS. 5B and 5C, the time stratum definition database 103 stores time element definition information 1032 and time stratum information 1033, as information representative of a time stratum structure. The time stratum definition database 103 is stored in common in at all environmental information aggregating apparatus 1.

The time element definition information 1032 contains items for defining each time section: a "time section identifier" for identifying each time section, and a "date and time value" representative of the time section.

The time stratum information 1033 has records each storing a pair of a "parent time section identifier" representative of a parent time section and a "sibling identifier" representative of a sibling time section respectively in the stratum relation between time sections. For example, a record group 10331 in the time stratum information 1033 defines that a time section of "2006 year" having the "parent time section identifier" of "T2006" includes time sections "January, 2006" having the "sibling time section identifier" of "T200601" to "December, 2006" having the "sibling time section identifier" of "T2006012".

A record group 10332 defines that a time section of "February, 2006 year" having the "parent time section identifier" of "T200602" includes time sections "Feb. 1, 2006" having the "sibling time section identifier" of "T20060201" to "Feb. 28, 2006" having the "sibling time section identifier" of "T20060228".

In this embodiment, the time section has the units of year, month and day. Instead, the time section may have one hour unit from "0 (hour)" to "23 (hour)".

The aspect database 104 stores aspect data. The aspect data includes numerical values transmitted from sensors and the like (not shown) for measuring aspect values and numerical values aggregated at the aggregating part 108.

FIGS. 6A and 6B are diagrams showing examples of information stored in the aspect database 104. As shown in FIGS. 6A and 6B, the aspect database 104 of the embodiment stores lower end aspect information 1041 and aspect aggregation information 1042.

The lower end aspect information 1041 is measured aspect values acquired from the sensors and the like (not shown) via the aspect input interface 109, and has records storing items including an "aspect identifier" of the aspect, an "organization identifier" of the organization which acquired the measured values of the aspect, a "date and time" when the measured values of the aspect were acquired, and a "numerical value" representative of the measured value of the aspect.

The aspect aggregation information 1042 stores aggregation information on each record of the lower end aspect information 1041 aggregated during a predetermined aggregation period by a procedure of the aggregating part 108 to be described later, and information on an upper aspect calculated from the aggregation information or information basing upon the aspect information transmitted from the lower apparatus, and has records storing items including an "aspect identifier" of the aspect, an "organization identifier" of the organization which aggregated records of the aspect, a "time section identifier" indicating an aggregation period of the aspect, and a "numerical value" indicating the aggregated value of the aspect. A procedure of acquiring records stored in the aspect aggregation information 1042 will be later described.

Since the numerical value of the upper aspect can be derived by aggregating numerical values of the lower end aspects at the aggregating part 108, an aspect whose records can be registered in the lower end aspect information 1041 is limited to the lower end aspect.

The transmission conversion definition database 105 stores transmission conversion information including conversion coefficients for converting aggregated aspect values in accordance with the format of the upper apparatus, when the lower apparatus transmits the aspect information to the upper apparatus.

FIG. 7 is a diagram showing an example of transmission conversion information stored in the transmission conversion definition database 105. The transmission conversion information 1051 shown in FIG. 7 includes, for each "aspect identifier" of the aspect to be converted, item records including an "upper organization identifier" representative of an organization identifier of an upper apparatus to which the aspect information is to be transmitted, an "upper aspect identifier" representative of the aspect identifier of the aspect at the upper apparatus, an "organization identifier in the upper organizations" representative of the organization identifier of the lower apparatus at the upper apparatus, and a "conversion coefficient" to be multiplied by the aggregated value of the aspect.

The item of the "organization identifier in upper organizations" is provided to identify the organization identifier of the lower apparatus, because a plurality of organization identifiers are assigned to the lower apparatus if the organization stratum definition database 102 shown in FIG. 4 has a plurality of pieces of the organization stratum information 1023.

The environmental information aggregating apparatus 1 of the embodiment made of the above-described constituent elements may be realized by a general computer having a central processing unit (CPU), a random access memory (RAM), a read only memory (ROM), a hard disc drive, a network interface, a display card and the like. In this case, the upper connection interface 106, lower connection interface 107, aggregating part 108 and registration display interface 110 of the environmental information aggregating apparatus 1 can be realized by developing a custom program stored in a disc of the hard disk drive, making CPU execute the program, and properly using the network interface, display card and the like of the computer. Each of the databases 101, 102, 103, 104 and 105 can be realized by assigning areas of a hard disc.

(Aspect Aggregation Procedure)

Detailed description will now be made on a procedure of aggregating lower end aspect information 1041 at the aggregating part 108 of the environmental information aggregating apparatus 1 having the structure described above.

Figure 8:
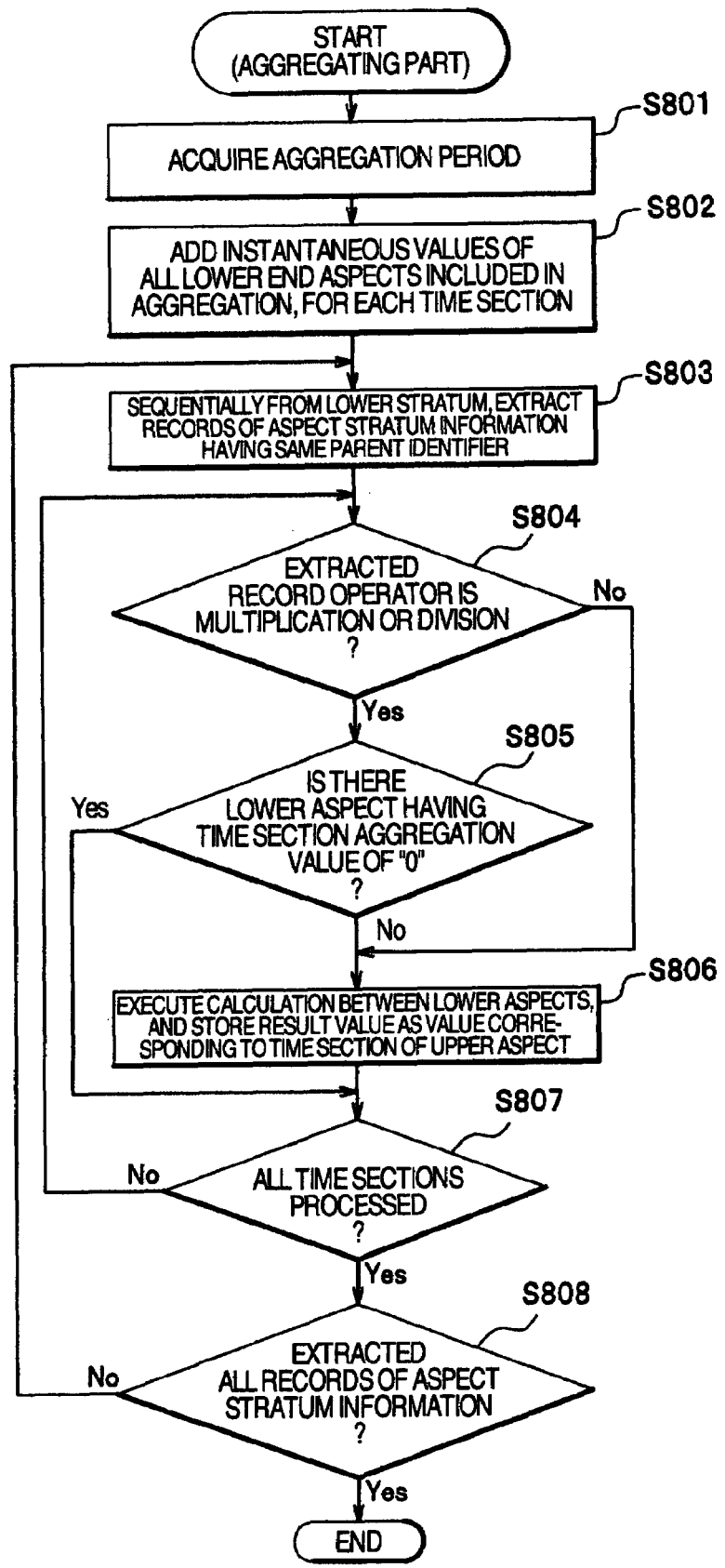
FIG. 8 is a flow chart illustrating the procedure of aggregating lower end aspect information at an aggregating part.

FIG. 8 is a flow chart illustrating the procedure of aggregating lower end aspect information 1041 at the aggregating part 108. With reference to the flow chart of FIG. 8, description will be made on the procedure at the aggregating part 108 of the environmental information aggregating apparatus 1 (referring to FIGS. 1 to 7 when necessary).

The following procedure is performed on the assumption that each piece of information described above is stored in each of the databases 101, 102, 103, 104 and 105 of the environmental information aggregating apparatus 1.

The aggregating part 108 acquires first an aggregation period during which aggregation is performed (Step S801). In acquiring the aggregation period, information designating a time section corresponding to the time stratum definition information 1032 of the time stratum definition database 103 may be acquired or the lowest level time section in the time stratum information 1033 of the time stratum definition database 103 may be acquired as the aggregation period, respectively by using an input device (not shown) such as a keyboard.

If the lowest level time section in the time stratum information 1033 is acquired as the aggregation period, it is desired to execute the following processes for all time sections sequentially from the lowest level to highest level time sections, by acquiring the aggregation times at the aggregating part 108.

Next, the aggregating part 108 executes the following aggregating process for the records containing the "date and time" item in the aggregation period acquired at Step S801, in the record group of the lower end aspect information 1041 of the aspect database 104.

First, numerical values of the lower end aspects contained in the aggregation period acquired at Step S801 are added/aggregated for each of all time sections contained in the aggregation period (Step S802). Necessity of this addition/aggregation will be described hereunder.

A measured value is generally acquired at various days and times. For example, an electric power amount is obtained often from a difference from the previous measured value. The electric power amount is known when an electric power fee of each month is known, and recorded at every day check or every one second with a power meter. Further, the number of manufactured products is recorded at the end of each day, or recorded in the unit of hour.

Each numerical value of the aspect is often an instantaneous value at a different time, depending upon the type of the aspect and the acquisition method. Therefore, although addition/aggregation in the predetermined time section is possible, aggregation by multiplication and division may not be possible. Namely, if both data at the same time is not correctly known, it cannot be determined that data at the partner aspect at what time is to be multiplied or divided.

In this embodiment, therefore, the aggregating part 108 calculates at Step S802 a value of addition/aggregation of each numerical value of each aspect in predetermined time sections having various lengths. It is therefore possible to perform multiplication and division for values aggregated in the same time section. It is to be noted that many aspects such as an electric power use amount, a sales amount and a manufacture amount have the nature that addition/aggregation along a time axis can be generally performed. With this nature, it is possible to change instantaneous values of aspects at different times to the aggregated values in the same time section.

Depending upon the type of the aspect, there is an aspect having the nature improper to addition/aggregation of numerical values in the time section. For example, if the aspect is an electric power (W), an average value in the time section is calculated.

Next, the aggregating part 108 extracts the records of the aspect stratum information 1013 of the aspect stratum definition database 101 having the same "parent identifier", sequentially from the lower stratum of the aspect stratum structure 1011, for each aspect subjected to addition/aggregation at Step S802. The records having the same "parent identifier" have "operators" for calculating the aspect having the "parent identifier".

Sequentially from the lowest level time section contained in the aggregation period, the following upper aspect calculation process is repeated for the aggregated value of the aspect having the same time section.

First, it is judged whether the operator for calculating the upper aspect is multiplication or division (Step S804).

If multiplication or division is used for calculating an upper aspect and a numerical value of one aspect is "0", the numerical value of the upper aspect becomes "0" or infinite. Therefore, if the operator is multiplication or division ('Yes' at Step S804), it is judged whether the lower aspects for calculating the upper aspect have the time section aggregation value of "0" (Step S805). If there is the lower aspect having the time section aggregation value of "0" ("Yes" at Step S805), the flow advances to Step S807 without calculating the upper aspect (skipping Step S806).

If the operator is neither multiplication nor division ('No' at Step S804) and if the lower aspects do not have the time section aggregation value of "0" ("No" at Step S805), then calculation is executed between the lower aspects by using the operators of the records extracted from the aspect stratum information 1013, and the calculation result value is stored in the aspect aggregation information 1042 of the aspect database 104, as the numerical value corresponding to the time section of the upper aspect (Step S806).

Next, the aggregating part 108 judges whether all time sections included in the aggregation period acquired at Step S801 have been processed (Step S807). If all time sections are not processed ('No' at Step S807), processes at Step S804 and following Steps are repeated for aggregation values in the time section upper than the time section presently completed. If all time sections are processed ("Yes" at Stp S807), it is judged at Step S808 whether all records in the aspect stratum information 1013 are extracted (Step S808). If it is judged that all records are not extracted ('No' at Step S808), it is judged that there is an aspect still not calculated, to thereafter repeat the processes at Step S803 and following Steps. If all records are extracted ('Yes' at Step S808), it is judged that all aspects were calculated, to thereafter terminate the processes of the aggregating part 108.

With these processes, numerical values of all aspects in all time sections included in the aggregation period are stored in the aspect aggregation information 1042 of the aspect database 104.

(Aspect Transmission Procedure)

Next, description will be made on the sequence of transmitting aspect information from a lower apparatus to an upper apparatus of the environmental information aggregating system shown in FIG. 1, in a state that the lower end aspect information 1041 of the aspect database 104 is aggregated and stored in the aspect aggregation information 1042 by the processes of the aggregating part 108. The detail procedure at each of the upper and lower apparatus will be given later.

Figure 9:
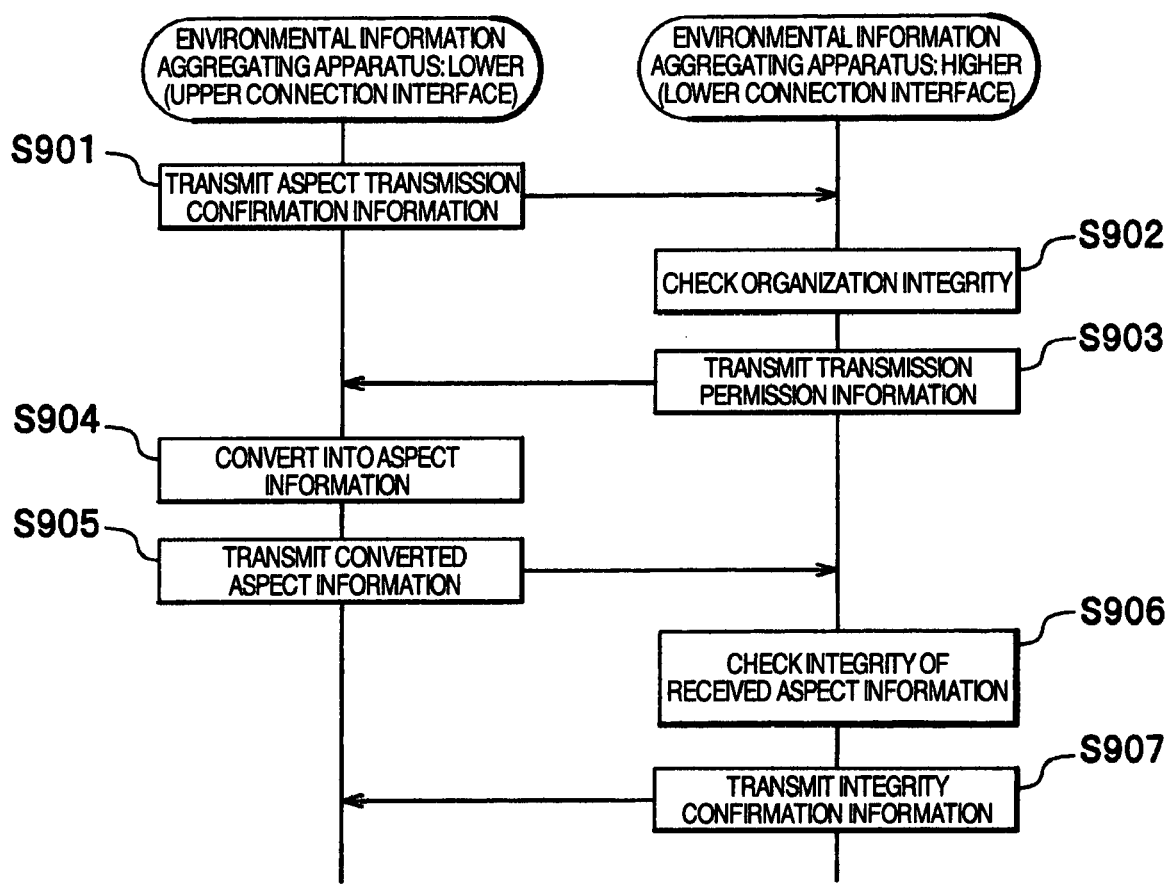
FIG. 9 is a sequence diagram illustrating a procedure of transmitting aspect information from a lower apparatus to an upper apparatus.

FIG. 9 is a sequence diagram illustrating the outline procedure of transmitting aspect information from the upper apparatus to lower apparatus of two environmental information aggregating apparatus 1 connected between upper and lower strata. With reference to the sequence diagram of FIG. 9, description will be made on the outline of the procedure of transmitting aspect information (refer to FIG. 1 to 7 when necessary).

First, the upper connection interface 106 of the lower apparatus transmits aspect transmission confirmation information to the upper apparatus to confirm whether aspect information transmission is possible (Step S901). The lower connection interface 107 of the upper apparatus received the aspect transmission confirmation information checks organization integrity of whether the lower apparatus transmitted the aspect transmission confirmation information is registered in the organization stratum definition database 102 (Step S902). If the lower connection interface 107 of the upper apparatus judges that there is no problem of the organization integrity, the upper apparatus transmits transmission permission information to the lower apparatus (Step S903).

Next, the upper connection interface 106 of the lower apparatus received the transmission permission information converts the aspect information by referring to the transmission conversion definition database 105 (Step S904), and transmits the converted aspect information to the upper apparatus (Step S905). The lower connection interface 107 of the upper apparatus received the converted aspect information checks integrity of the received aspect information (Step S906), if there is no problem of the integrity, stores the aspect information in the aspect database 104, and transmits integrity confirmation information indicating no problem of the integrity to the lower apparatus (Step S907).

With the above-described procedure, aspect information can be transmitted to the lower apparatus to upper apparatus.

(Operation of Upper Connection Interface)

Next, description will be made on the detailed operation procedure of the upper connection interface 106 of the environmental information aggregating apparatus 1.

Figure 10:
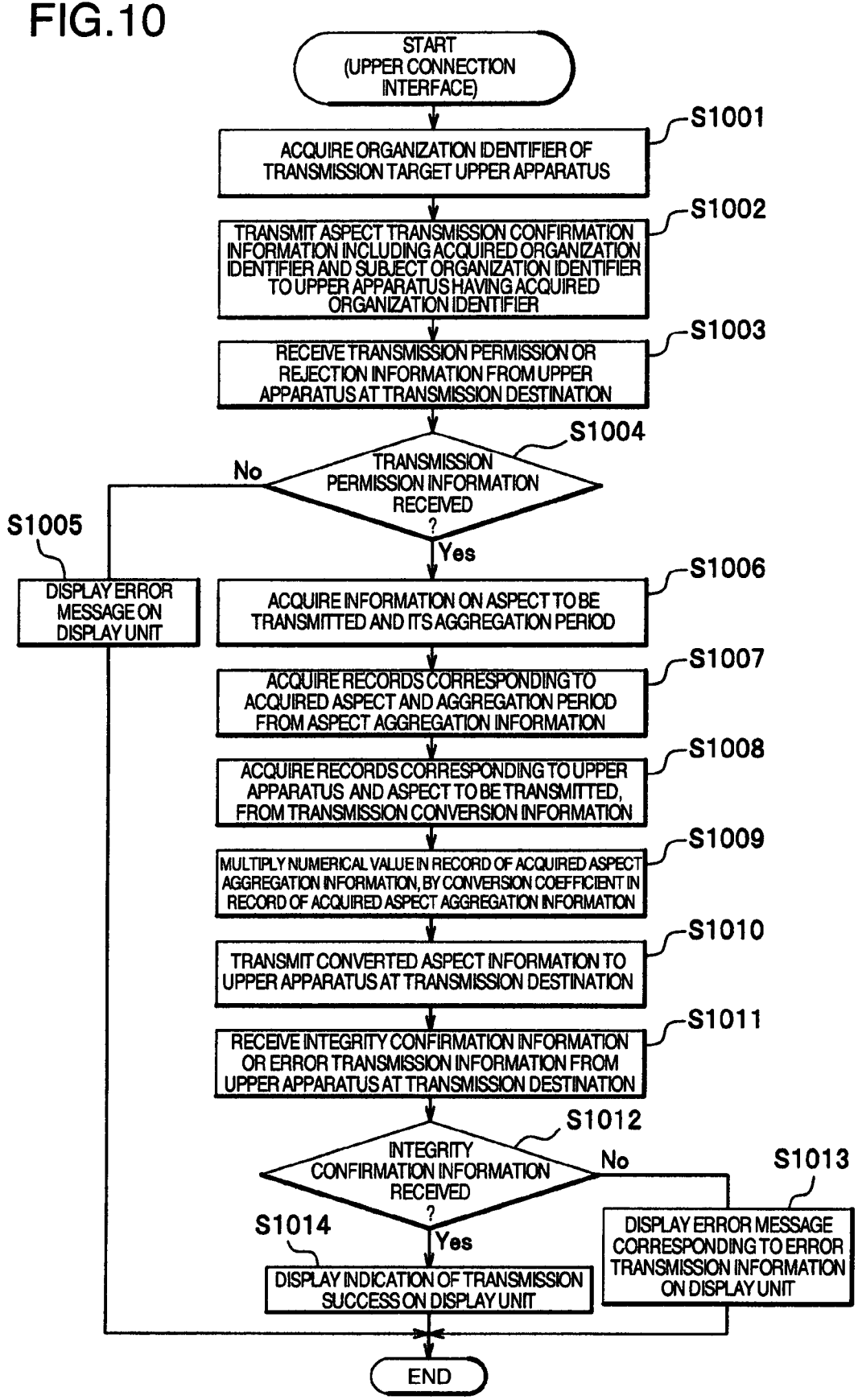
FIG. 10 is a flow chart illustrating an operation procedure to be executed at an upper connection interface of a lower apparatus.

FIG. 10 is a flow chart illustrating the detailed operation procedure of the upper connection interface 106 of the lower apparatus, regarding the operation illustrated in the sequence diagram of FIG. 9. With reference to the flow chart of FIG. 10, the operation procedure of the upper connection interface 106 will be described (by referring to FIGS. 1 to 7 and FIG. 9 when necessary).

First, the upper connection interface 106 of the lower apparatus acquires an organization identifier of the upper apparatus to which the aspect information is to be transmitted (Step S1001). In this case, the organization identifier of the upper organization is acquired by using the display screen displayed by the registration display interface 110.

Figure 12:
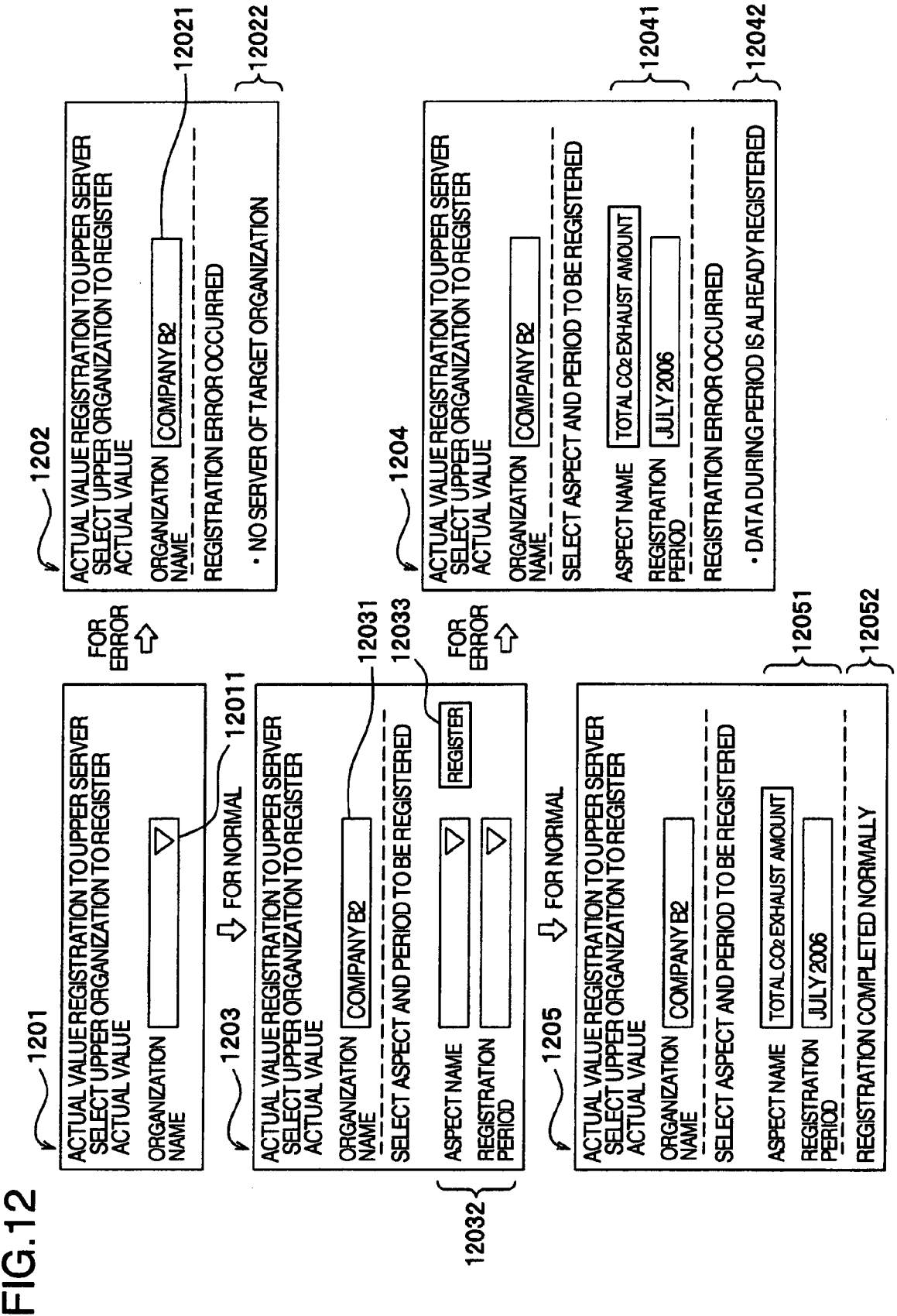
FIG. 12 is a diagram showing transition examples of a display screen output from a registration display interface.

FIG. 12 is a diagram showing transition examples of the display screen output from the registration display interface 110. In the display screen shown in FIG. 12, reference numeral 1201 represents a display screen for entering an organization identifier. A person in charge of operating the lower apparatus selects a transmission target organization from a pull-down menu 12011 of the display screen by using a pointing device (not shown). In response to this, the organization identifier corresponding to the selected organization is transmitted to the upper connection interface 106. In this manner, the upper connection interface 106 acquires the organization identifier of the upper apparatus to which the aspect information is to be transmitted.

In the display screen 1201, for the organizations displayed in the pull-down menu 12011, the "names" of the environmental information aggregating apparatus 1 at an upper level than that of the subject apparatus is displayed, in accordance with the organization stratum information 1023 of the organization stratum definition database 102.

Next, the upper connection interface 106 transmits aspect transmission confirmation information including the acquired organization identifier and its own organization identifier to the upper apparatus having the organization identifier acquired at Step S1001 (Step S1002). The upper connection interface receives transmission permission or rejection information transmitted from the upper apparatus at the transmission destination in response to the aspect transmission confirmation information (Step S1003). The procedure of transmitting the transmission permission or rejection information from the upper apparatus will be later described in the operation description of the lower connection interface 107. The procedure at Step S1002 corresponds to Step S901 in the sequence diagram of FIG. 9.

The upper connection interface 106 received the transmission permission or rejection information judges whether the transmission permission information is received (Step S1004). If it is judged that the transmission permission information is not received ("No" at Step S1004), the registration display interface 110 displays an error message on a display unit (Step S1005) to thereafter terminate the process.

A display screen 1202 in FIG. 12 shows an example of the display screen output from the registration display interface 110 at Step S1005. In the display screen, the name 12021 of the organization selected at Step S1001 is shown in the area of the pull-down menu 12011 of the display screen 1201, and an error message is displayed in an area 12022.

If the transmission permission information is not received within a predetermined time at the judgment Step S1004, it is desired to judge as time-out and advance to Step S1005.

If the transmission permission information is received at Step S1003 ('Yes' at Step S1004), the upper connection interface 106 acquires information on the aspect to be transmitted and its aggregation period (Step S1006). In this case, the information on the aspect to be transmitted and its aggregation period are acquired by using the display screen displayed by the registration display interface 110.

A display screen 1203 in FIG. 12 is a display screen for inputting the aspect to be transmitted and its aggregation period.

In the display screen 1203, the person in charge of operating the lower apparatus selects the aspect to be transmitted and its aggregation period (registration period) from two pull-down menus 12032 of the display screen by using a pointing device (not shown). The pull-down menu 12032 for the "aspect name" includes an aspect having the aspect identifier having the "upper registration object flag" of "1" of the aspect definition information 1012 of the aspect database 104. As the aspect is selected from the pull-down menu 12032 for the "aspect name", the records of the selected aspect are extracted from the records of the aspect aggregation information 1042 of the aspect database 104, and the aggregation period corresponding to the time section identifier is displayed in the pull-down menu 12032.

As the person in charge selects a registration button 12032 after the aspect to be transmitted and its aggregation period are selected from the pull-down menus 12033, the aspect identifier and time section identifier corresponding to the selected aspect and its aggregation period are transmitted to the upper connection interface 106.

The organization name selected at Step S1001 is displayed in an area 12301 of the display screen 1203.

Next, the upper connection interface 106 acquires the records corresponding to the aspect and aggregation period acquired at Step S1006, from the aspect aggregation information 1042 of the aspect database 104 (Step S1007). Since the upper connection interface 106 acquired the aspect identifier and time section identifier corresponding to the selected aspect and its aggregation period from the registration display interface 110 at Step S1006 as described above, the records corresponding to the aspect identifier and time section identifier are acquired uniquely from the aspect aggregation information 1042.

The records corresponding to the upper apparatus to which the aspect information is to be transmitted and the aspect are acquired from the transmission conversion information 1051 of the transmission conversion definition database 105 (Step 31008). The upper connection interface 106 acquires uniquely the records corresponding to the organization identifier of the upper apparatus acquired at Step S1001 and the aspect identifier acquired at Step S1006, from the transmission conversion information 1051.

Next, the upper connection interface 106 multiplies the "numerical value" in the record of the aspect aggregation information 1042 of the aspect database 104 acquired at Step S1007, by the "conversion coefficient" in the record of the transmission conversion information 1051 of the transmission conversion definition database 105 (Step S1009). With this process, the aspect information is converted in accordance with the format of the upper apparatus.

The converted aspect information is transmitted to the transmission destination upper apparatus (Step S1010). The aspect information transmitted to the upper apparatus contains the item values of a transmission date and time, a subject organization identifier, an upper organization identifier, an upper aspect identifier, a time section identifier, and a numerical value, respectively in the records of the transmission conversion information 1051 acquired at Step S1008 and the records of the aspect aggregation information 1042 acquired at Step S1007.

Steps S1006 to S1009 correspond to Step S904, and Step S1010 corresponds to Step S905, respectively in the sequence diagram of FIG. 9.

Next, in response to the aspect information transmitted at Step S1010, the upper connection interface 106 receives integrity confirmation information or error transmission information transmitted from the upper apparatus at the transmission destination (Step S1011) to judge whether the integrity confirmation information is received (Step S1012). If it is judged that the integrity confirmation information is not received ('No' at Step S1012), the registration display interface 110 displays an error message corresponding to the received error transmission information, on the display unit (Step S1013) to thereafter terminate the process. A display screen 1204 shown in FIG. 12 is an example of a display screen displayed on the display unit by the registration display interface 110 at Step S1013. In this display screen, the name of the aspect to be transmitted and its registration period (corresponding to the aggregation period) acquired at Step 1006 are displayed in an area 12041, and an error message corresponding to the error transmission information is displayed in an area 12042.

The procedure of transmitting the integrity confirmation information or error transmission information from the upper apparatus and the information contained in the error transmission information will be later given in detail in the operation description of the lower connection interface 107.

If the integrity confirmation information is received ('Yes' at Step S1012), an indication of transmission success is displayed on the display unit (Step S1014) to thereafter terminate all processes. A display screen 1205 shown in FIG. 12 is an example of a display screen displayed on the display unit by the registration display interface 1101 at Step S1014. In this display screen, the name of the aspect to be transmitted and its registration period (corresponding to the aggregation period) acquired at Step S1006 are displayed in an area 12051, and a message of normal transmission is displayed in an area 12052.

With the procedure described above, the aspect information is transmitted from the upper connection interface 106 of a lower apparatus to an upper apparatus. Next, description will be made on the detailed operation procedure of the lower connection interface 107 of the environmental information aggregating apparatus 1.

(Operation of Lower Connection Interface)

Figure 11:
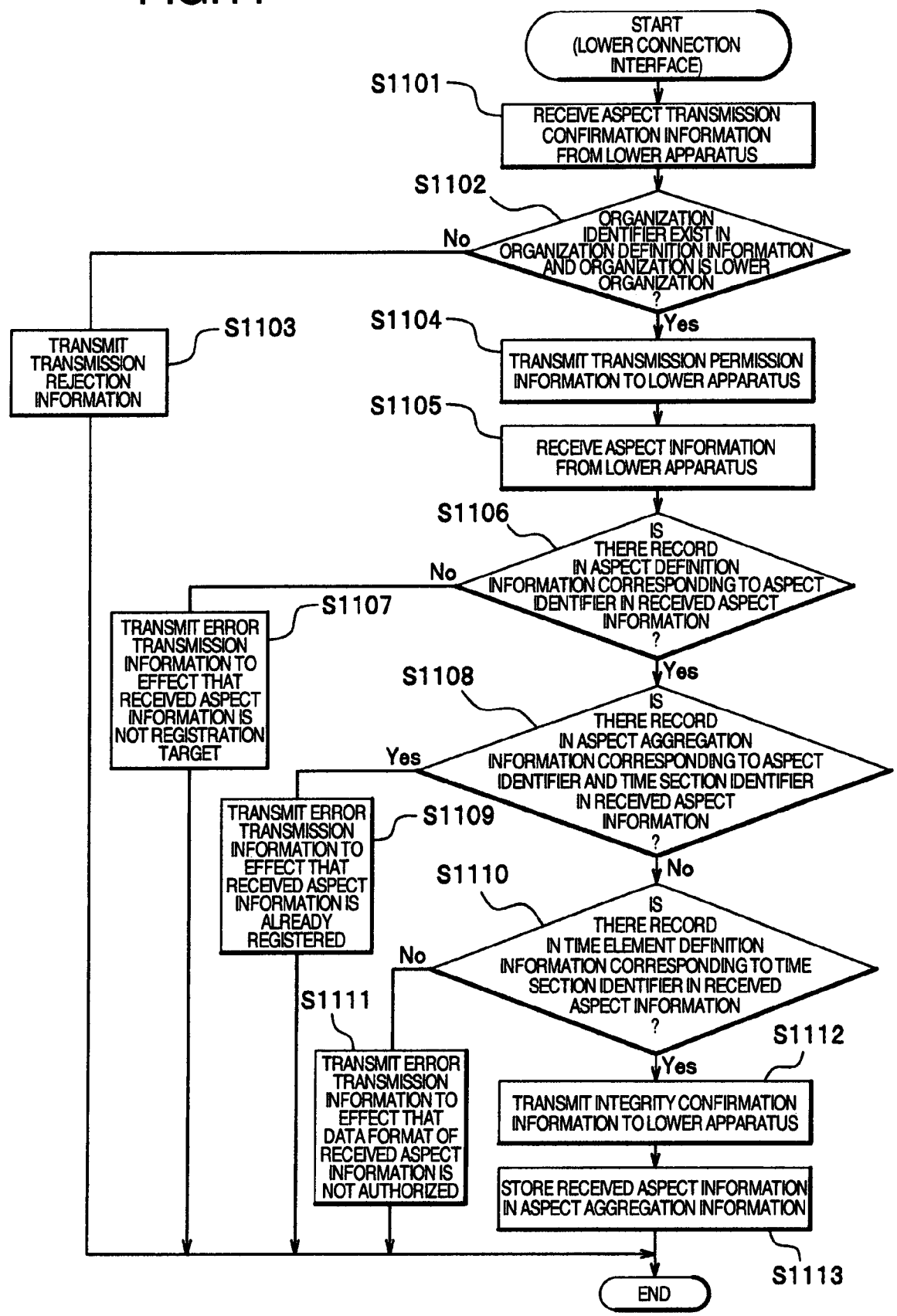
FIG. 11 is a flow chart illustrating an operation procedure to be executed at a lower connection interface of an upper apparatus.

FIG. 11 is a flow chart illustrating the detailed operation procedure of the lower connection interface 107 of the upper apparatus, regarding the operation illustrated in the sequence diagram of FIG. 9. With reference to the flow chart of FIG. 11, the operation procedure of the lower connection interface 107 will be described (by referring to FIGS. 1 to 7 and FIGS. 9 and 10 when necessary).

First, the lower connection interface 107 of the upper apparatus receives the aspect transmission confirmation information from the lower apparatus (Step S1101). The aspect transmission confirmation information was transmitted at Step S1002 in the flow chart of FIG. 10 (Step S901 in FIG. 9), and contains the organization identifiers of the upper and lower apparatus.

It is judged whether the organization identifier of the lower apparatus exists in the organization definition information 1022 of the organization stratum definition database 102, and it is judged from the organization stratum information 1023 whether the lower organization is actually an organization lower the subject organization (Step S1102). If it is judged that the organization identifier does not exist in the organization definition information 1022 or the organization is not the lower organization ('No' at Step S1102), the transmission rejection information containing information representative of the reason of transmission rejection is transmitted to the lower apparatus (Step S1103).

Step S1102 corresponds to Step S902 in the sequence diagram of FIG. 9.

If it is judged at Step S1102 that the organization identifier exists in the organization definition information 1022 and the organization is the lower organization ('Yes' at Step S1102), the transmission permission information is transmitted to the lower apparatus (Step S1104). This procedure corresponds to Step S903 in the sequence diagram of FIG. 9.

The lower connection interface 107 receives the aspect information transmitted at Step S1010 in the flow chart shown in FIG. 10 from the lower apparatus (Step S1105). As described above, the aspect information transmitted from the lower apparatus contains the item values including the transmission date and time, organization identifier of the lower apparatus, organization identifier of the upper apparatus, aspect identifier of the upper apparatus, time section identifier, and numerical value.

The lower connection interface 107 judges whether there is a record of the aspect definition information 1012 of the aspect stratum definition database 101 corresponding to the aspect identifier (aspect identifier of the upper apparatus) of the received aspect information (Step S1106). If it is judged that there is no corresponding record ('No' at Step S1106), error transmission information to the effect that the received aspect information is not a registration target is transmitted to the lower apparatus transmitted the aspect information (Step S1107) to thereafter terminate the process.

If it is judged at Step S1106 that there is a corresponding record ('Yes' at Step S1106), it is judged whether there is a record in the aspect aggregation information 1042 of the aspect database 104 corresponding to the aspect identifier (aspect identifier of the upper apparatus) and the time section identifier, respectively in the received aspect information (Step S1108). If it is judged that there is a corresponding record ('Yes' at Step S1108), error transmission information to the effect that the received aspect information is already registered is transmitted to the lower apparatus transmitted the aspect information (Step S1109) to thereafter terminate the process.

If it is judged at Step S1108 that there is no corresponding record ('No' at Step S1108), it is judged whether there is a record in the time element definition information 1032 of the time stratum definition database 103 corresponding to the time section identifier of the received aspect information (Step S1110). If it is judged that there is no corresponding record ('No' at Step S1110), error transmission information to the effect that the data format of the received aspect information is not authorized, is transmitted to the lower apparatus transmitted the aspect information (Step S1111) to thereafter terminate the process.

If it is judged at Step S1106 that there is a corresponding record ('Yes' at Step S1110), integrity confirmation information is transmitted to the lower apparatus transmitted the aspect information (Step S1112).

Steps S1106 to S1110 correspond to Step S906, and Step S1112 corresponds to Step S907, respectively in the sequence diagram of FIG. 9.

The lower connection interface 107 stores the received aspect information in the aspect aggregation information 1042 of the aspect database 104 (Step S1113) to thereafter terminate all processes.

With the above-described procedure, the aspect information transmitted from the lower apparatus is stored in the aspect database 104 of the upper apparatus.

(Transmission Example of Aspect Information)

Next, description will be made on an example of aspect information to be transmitted from the upper apparatus to lower apparatus in the procedures shown in FIGS. 9 to 11 (by referring to FIGS. 9 to 11 when necessary).

Figure 13:
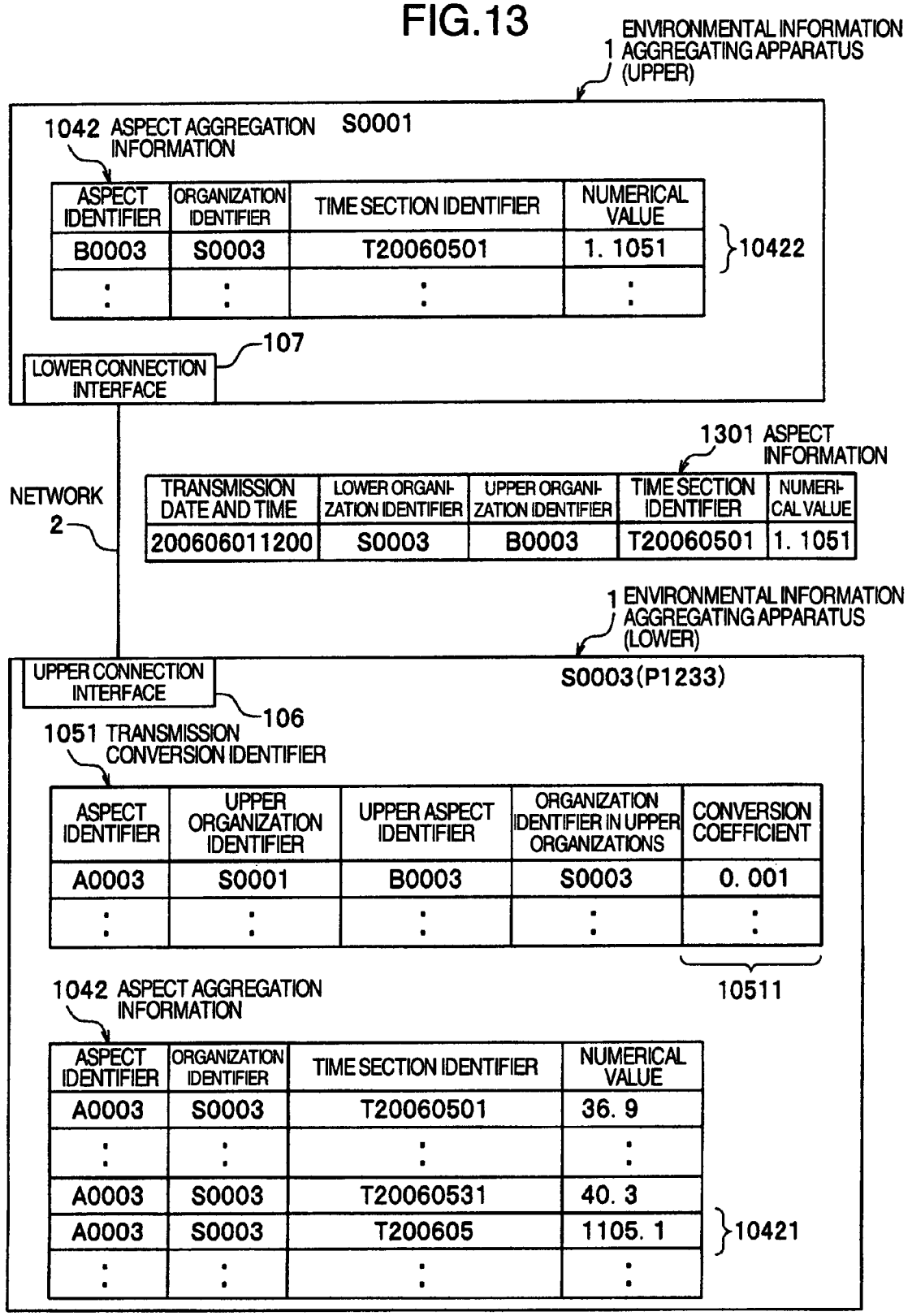
FIG. 13 is a diagram illustrating a process of converting aspect aggregation information at a lower apparatus and storing the converted aspect aggregation information in an upper apparatus.

FIG. 13 is a diagram illustrating a process in which the aspect aggregation information 1042 stored in the lower apparatus is converted and stored in the aspect aggregation information 1042 of the upper apparatus.

Consider by way of example a case in which at Step S1001 in the flow chart of FIG. 10, the upper connection interface 106 of the lower apparatus acquires "S0001" as the organization identifier of the upper apparatus, and at Step S1006, acquires "A0003" as the aspect identifier of the aspect to be transmitted and "T200605" as the time section identifier of the aggregation period. Therefore, at Step S1007, records 10421 are acquired from the aspect aggregation information 1042 of the lower apparatus.

The first record of the transfer conversion information 1051 is acquired at Step S1008. At Step S1009, the "numerical value" of "1105.1 in the records 10421 of the aspect aggregation information 1042 is multiplied by the "conversion coefficient" 10511 of "0.001" of the transmission conversion information 1051 to obtain "1.1051.

By using this value, at Step S1010 the upper connection interface 106 generates aspect information 1301 and transmits it to the upper apparatus.

The lower connection interface 107 of the upper apparatus received this aspect information confirms integrity of the aspect information at Steps S1106 to S1110 in the flow chart shown in FIG. 11, and at Step S1113 stores the item values of the "time section identifier" and "numerical value" of the received aspect information, the item value of the "upper aspect identifier as the "aspect identifier" and the item value of the "lower organization identifier" as the "organization identifier", respectively in records 10422 of the aspect aggregation information 1042.

According to the environmental information aggregating apparatus 1 of the embodiment described above, distributed information aggregation is performed in a network having a large scale stratum structure. Therefore, a load upon the server can be distributed more than the server-client system.

Further, since information on the environmental aspect is held in a distributed manner in each organization, a system can be configured without a large scale database.

Each organization can manage information by using its own format.

It is possible to convert information in conformity with another organization format, by using the transmission conversion definition information 1051. Therefore, the system can be operated flexibly even if there is design change.

The present invention can be embodied in various modifications without being limited to the above-described embodiment of the invention.

For example, the environmental information aggregating apparatus 1 at the highest level in the organization stratum may omit the upper connection interface 106, or conversely, the environmental information aggregating apparatus 1 at the lowest level may omit the lower connection interface 107.

In the environmental information aggregating apparatus of the above-described embodiment, the aggregating part 108 generates in advance the aspect aggregation information 1042, and the upper connection interface 106 converts it and transmits. However, the upper connection interface 106 and aggregating part 108 may be combined to calculate aspect aggregation information during the transmission target aggregation period each time an instruction of transmitting aspect information to the upper apparatus is received, and to convert the calculated result to generate the aspect information.

The environmental information aggregating apparatus 1 may not have the lower connection interface, but the aspect information transmitted from the lower apparatus may be stored directly in the aspect aggregation information 1042.

The environmental information aggregating apparatus 1 may not have the aggregating part 108, but the upper connection interface 106 may convert the lower end aspect information 1041 still not aggregated, in accordance with the format of the upper organization, and transmit it.

Further, although the above-described embodiment deals with information on environmental aspect, the present invention is not limited thereto but is applicable to aggregating distributed information in the stratum organization.

Therefore, the present invention should be construed to be determined from technical thought described in the scope of claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An environmental information aggregating apparatus for transmitting information on an environmental aspect having a stratum structure to an external apparatus, comprising:

a storage unit for storing: in correspondence with an aspect identifier for identifying the environmental aspect, measured aspect information including a measured value of the environmental aspect and a measurement time; a time section identifier indicating a predetermined time section; transmission conversion information including a coefficient for converting a numerical value of the environmental aspect in accordance with a unit system of the external apparatus and an aspect identifier for identifying the environmental aspect at the external apparatus; and aspect stratum information including: a predetermined coefficient to be multiplied by a numerical value of an environmental aspect of a lower stratum when an environmental aspect of an upper stratum is calculated from the environmental aspect of the lower stratum; an operator for one of addition, subtraction, multiplication and division for calculating the environmental aspect of the upper stratus by using the numerical value of the environmental aspect of the lower stratum multiplied by the predetermined coefficient; and an aspect identifier of the environmental aspect of the upper stratum to be calculated; and a calculating/processing unit for: calculating an aggregated value of each measured value of the environmental aspect measured during the time section, in accordance with each measurement time of the measured aspect information; calculating a numerical value of the environmental aspect of the upper stratum during the time section in accordance with the aspect stratum information; converting the calculated numerical value and the aggregated value by using the coefficient of the transmission conversion information; generating aspect information including a conversion result value, the aspect identifier of the external apparatus in the transmission conversion information and the time section identifier of the time section during aggregation; and transmitting the generated aspect information to the external apparatus.

2. The environmental information aggregating apparatus according to claim 1, wherein said calculating/processing unit acquires the aspect identifier for identifying an environmental aspect desired to be transmitted and the time section identifier, and transmits the aspect information corresponding to the acquired aspect identifier and time section identifier, to the external apparatus.

3. The environmental information aggregating apparatus according to claim 2, wherein upon reception of aspect information from the external apparatus, said calculating/processing unit judges whether an aspect identifier corresponding to the aspect identifier of the received aspect information exists in said storage unit, and stores the received aspect information in said storage unit only when it is judged that the aspect identifier exists in said storage unit.

4. An environmental information aggregating method in an environmental information aggregating apparatus for transmitting information on an environmental aspect to an external apparatus, in which a computer transmits the information on the environment aspect to the external apparatus, the computer storing in a storage unit: in correspondence with an aspect identifier for identifying the environmental aspect having a stratum structure, measured aspect information including a measured value of the environmental aspect and a measurement time; a time section identifier indicating a predetermined time section; transmission conversion information including a coefficient for converting a numerical value of the environmental aspect in accordance with a unit system of the external apparatus and an aspect identifier for identifying the environmental aspect at the external apparatus; and aspect stratum information including: a predetermined coefficient to be multiplied by a numerical value of an environmental aspect of a lower stratum when an environmental aspect of an upper stratum is calculated from the environmental aspect of the lower stratum; an operator for one of addition, subtraction, multiplication and division for calculating the environmental aspect of the upper stratus by using the numerical value of the environmental aspect of the lower stratum multiplied by the predetermined coefficient; and an aspect identifier of the environmental aspect of the upper stratum to be calculated, comprising the steps performed by a calculating/processing unit of said computer of:

calculating an aggregated value of each measured value of the environmental aspect measured during the time section, in accordance with each measurement time of the measured aspect information;

calculating a numerical value of the environmental aspect of the upper stratum during the time section in accordance with the aspect stratum information;

converting the calculated numerical value and the aggregated value by using the coefficient of the transmission conversion information;

generating aspect information including a conversion result value, the aspect identifier of the external apparatus in the transmission conversion information and the time section identifier of the time section during aggregation; and transmitting the generated aspect information to the external apparatus.

5. The environmental information aggregating method according to claim 4, further comprising the steps of: acquiring, by said calculating/processing unit, the aspect identifier for identifying an environmental aspect desired to be transmitted and the time section identifier, and transmitting the aspect information corresponding to the acquired aspect identifier and time section identifier, to the external apparatus.

* * * * *